US010021887B2

(12) United States Patent
McLemore et al.

(10) Patent No.: US 10,021,887 B2
(45) Date of Patent: Jul. 17, 2018

(54) STAND-ALONE GAS-FIRED SMOKER WITH MECHANICAL TEMPERATURE CONTROL

(71) Applicant: Masterbuilt Manufacturing, LLC., Columbus, GA (US)

(72) Inventors: John D. McLemore, Hamilton, GA (US); Joseph L. Turner, Butler, GA (US); Adam Carter, Auburn, AL (US); Robert Terrell, Waverly, AL (US); Daniel Mercer, West Point, GA (US)

(73) Assignee: Masterbuilt Manufacturing, LLC, Columbus, GA (US)

( * ) Notice: Subject to any disclaimer, the term of this patent is extended or adjusted under 35 U.S.C. 154(b) by 41 days.

(21) Appl. No.: 15/172,296

(22) Filed: Jun. 3, 2016

(65) Prior Publication Data

US 2016/0353756 A1 Dec. 8, 2016

Related U.S. Application Data

(60) Provisional application No. 62/172,484, filed on Jun. 8, 2015.

(51) Int. Cl.
*A23B 4/052* (2006.01)
*F23N 5/06* (2006.01)
*F23N 5/10* (2006.01)
*F24C 3/12* (2006.01)

(52) U.S. Cl.
CPC ............... *A23B 4/052* (2013.01); *F23N 5/06* (2013.01); *F24C 3/122* (2013.01); *F24C 3/128* (2013.01); *F23N 5/107* (2013.01); *F24C 3/12* (2013.01)

(58) Field of Classification Search
CPC .......... A23B 4/052; A47J 39/003; A21B 3/04; F23N 5/06; F23N 5/10; F23N 5/107; F24C 3/12; F24C 3/122; F24C 3/128; F24C 3/126
USPC ....... 99/482, 467, 476, 337; 126/21 A, 19 R, 126/273 R, 39 G, 39 E; 137/66, 601.19, 137/488, 489; 251/129.03, 26, 121; 431/153, 256
See application file for complete search history.

(56) References Cited

U.S. PATENT DOCUMENTS

| 3,171,468 A | * | 3/1965 | Sparrow | ................... F23N 5/10 |
| | | | | 137/83 |
| 4,511,326 A | * | 4/1985 | Lacroix | ................... F23N 1/007 |
| | | | | 236/68 D |
| 5,092,519 A | * | 3/1992 | Staats | ..................... F23N 1/085 |
| | | | | 236/21 B |

(Continued)

*Primary Examiner* — Reginald L Alexander
(74) *Attorney, Agent, or Firm* — Smith, Gambrell & Russell, LLP

(57) ABSTRACT

A stand-alone gas-fired smoker constitutes a cabinet for holding food products to be cooked. A gas burner in the bottom of the cabinet is connected to a source of flammable gas by means of a variable gas valve. The gas burner heats the cabinet and thereby cooks the food products. An oil filled temperature sensing bulb is connected by means of a capillary tube to the variable gas valve in order to modulate the gas delivered through the variable gas valve to the gas burner and thereby modulate the temperature within the cabinet. A safety/ignition valve is connected between of the gas source and the variable gas valve. The safety/ignition valve is connected to a flame sensor, and the safety/ignition valve closes if the flame sensor senses that the gas burner has been extinguished.

3 Claims, 12 Drawing Sheets

(56) References Cited

U.S. PATENT DOCUMENTS

| | | | | |
|---|---|---|---|---|
| 6,149,065 A | * | 11/2000 | White | F23N 1/007 236/15 A |
| 7,287,551 B2 | * | 10/2007 | James | F16K 1/52 137/629 |
| 7,703,386 B1 | * | 4/2010 | Bourgeois | A23B 4/0523 99/340 |
| 2007/0012359 A1 | * | 1/2007 | Liu | F23N 5/245 137/66 |
| 2016/0010860 A1 | * | 1/2016 | Vrolijk | F23N 5/107 137/613 |

* cited by examiner

STAND-ALONE GAS-FIRED SMOKER WITH MECHANICAL TEMPERATURE CONTROL

CLAIM OF PRIORITY

This application claims priority from U.S. Provisional Patent Application Ser. No. 62/172,484, filed on Jun. 8, 2015, which is incorporated herein in its entirety.

FIELD OF THE INVENTION

This invention relates to a smoker for slowly cooking food while imparting a smoked flavor to the food, and more particularly to controlling the temperature of a stand-alone gas-fired smoker.

BACKGROUND OF THE INVENTION

A conventional smoker assembly includes an cabinet containing one or more grill racks spaced vertically within the cabinet, a drip pan positioned below the grill for collecting food drippings, a water pan in the bottom of the cabinet, a heat source at the bottom of the cabinet, and a tray, placed adjacent the heat source, to hold the smoke generating material. Typical smoke generating material is wood and may include hickory, alder, and mesquite wood in a variety of forms including chips, briquettes, pellets, and saw dust. The heat source may include an electric heating element, a gas-fired burner, or combustible materials such as charcoal.

Smokers for slowly cooking food while imparting a smoke flavor to the food are illustrated, for example, in U.S. Pat. Nos. 7,426,885; 7,703,389; 5,713,267; 4,417,748; 4,309,938; 4,020,322; and 3,776,127. In addition, smokers that are designed as an added feature to a grill assembly are disclosed in U.S. Pat. Nos. 5,891,498; 5,718,165; 5,167,183; and 4,770,157. In addition, the prior art discloses a variety of apparatus for generating smoke and conveying the smoke to the food being smoked including U.S. Pat. Nos. 4,321,857; 6,209,533; and 5,138,939.

The smoking process is generally carried out at low to moderate temperatures over an extended period of time. For example, the internal temperature of the smoker is generally about 220° F.-230° F. At such temperatures, the smoking process generally takes about six hours. One smoking method, the 3-2-1 method, is often employed to smoke meat. For the first three hours, the meat is left uncovered on the smoker's grill rack so that the meat is surrounded by the smoke and thereby absorbs the smoke flavor from the heated wood chips. For the next two hours, the meat is wrapped in aluminum foil in order to steam and tenderize the meat. For the last hour, the meat is again left uncovered. The smoking process may also include basting the meat as the juices from the meat are caught in the drip pan and reapplied to the meat to keep the meat moist. In addition, the juices caught in the drip pan vaporize to maintain a moist atmosphere within the smoker cabinet thereby keeping the meat hydrated. The water pan also holds water or other flavor imparting liquids which, in conjunction with the heat source, add moisture to the atmosphere inside the smoker.

During the smoking a process, the internal temperature of the meat or other food product slowly rises, as a result of the heat created by the heat source at the bottom of the smoker, until the internal temperature of the meat reaches at least a safe level for consumption or to a higher level to suit the taste of the user.

Maintaining a constant set temperature in a smoker is important to ensure consistent results during the extended smoking process. Maintaining a constant temperature is affected by several factors including changes in atmospheric conditions outside of the smoker such as the presence of wind or rain, the temperature variation created by the introduction of the meat into the smoker, and the opening and closing of the door of the smoker to baste the meat, add wood chips, or check on the progress of the smoking process.

For electrically heated smokers, internal temperature of the smoker is controlled by an electric thermostat. The electric thermostat can react quickly to changes in internal temperature to maintain an essentially constant internal temperature.

For gas-fired smokers, controlling the internal temperature within a narrow range of variation is more difficult. Several considerations are present when controlling the internal temperature of a gas-fired smoker. The control system for a gas-fired smoker must react quickly to changes in internal temperature to maintain a relatively constant temperature while conserving gas, particularly when the smoker is used at a remote location.

SUMMARY OF THE INVENTION

The smoker of the present invention is a stand-alone gas-fired smoker. The gas-fired smoker has a cabinet with vertically spaced grill racks for holding the food to be smoked. In the lower part of the cabinet, the gas-fired smoker has a wood tray for holding wood chips or other smoke generating material and a liquid pan for holding water or other flavor imparting liquids. Drippings from the food fall either into the liquid pan or onto the bottom of the cabinet and from the bottom of the cabinet are diverted into a removable grease cup mounted below the bottom of the cabinet. A gas burner is located adjacent the bottom of the cabinet and provides heat for cooking the food. The gas-fired smoker also has a burner control mechanism that controls the temperature in the cabinet. The burner control mechanism includes a variable gas valve. A temperature sensor located inside the cabinet measures the average temperature within the cabinet, and based on the measured temperature, the temperature sensor controls the variable gas valve to modulate the amount of gas delivered to the burner and therefore to modulate the temperature in the cabinet.

The gas-fired smoker of the present invention also includes a safety/ignition valve that shuts off the gas to the gas burner if the gas burner is extinguished by the wind or any other circumstance during the cooking process. As a result of the operation of the safety/ignition valve, gas cannot build up in the cabinet or around the cabinet and create a fire and explosion hazard. The safety/ignition valve also shuts off gas to the gas burner if the gas burner fails to light when the igniter is activated.

Further objects, features and advantages will become apparent upon consideration of the following detailed description of the invention when taken in conjunction with the drawings and the appended claims.

DETAILED DESCRIPTION OF THE PREFERRED EMBODIMENT

Figure 1:
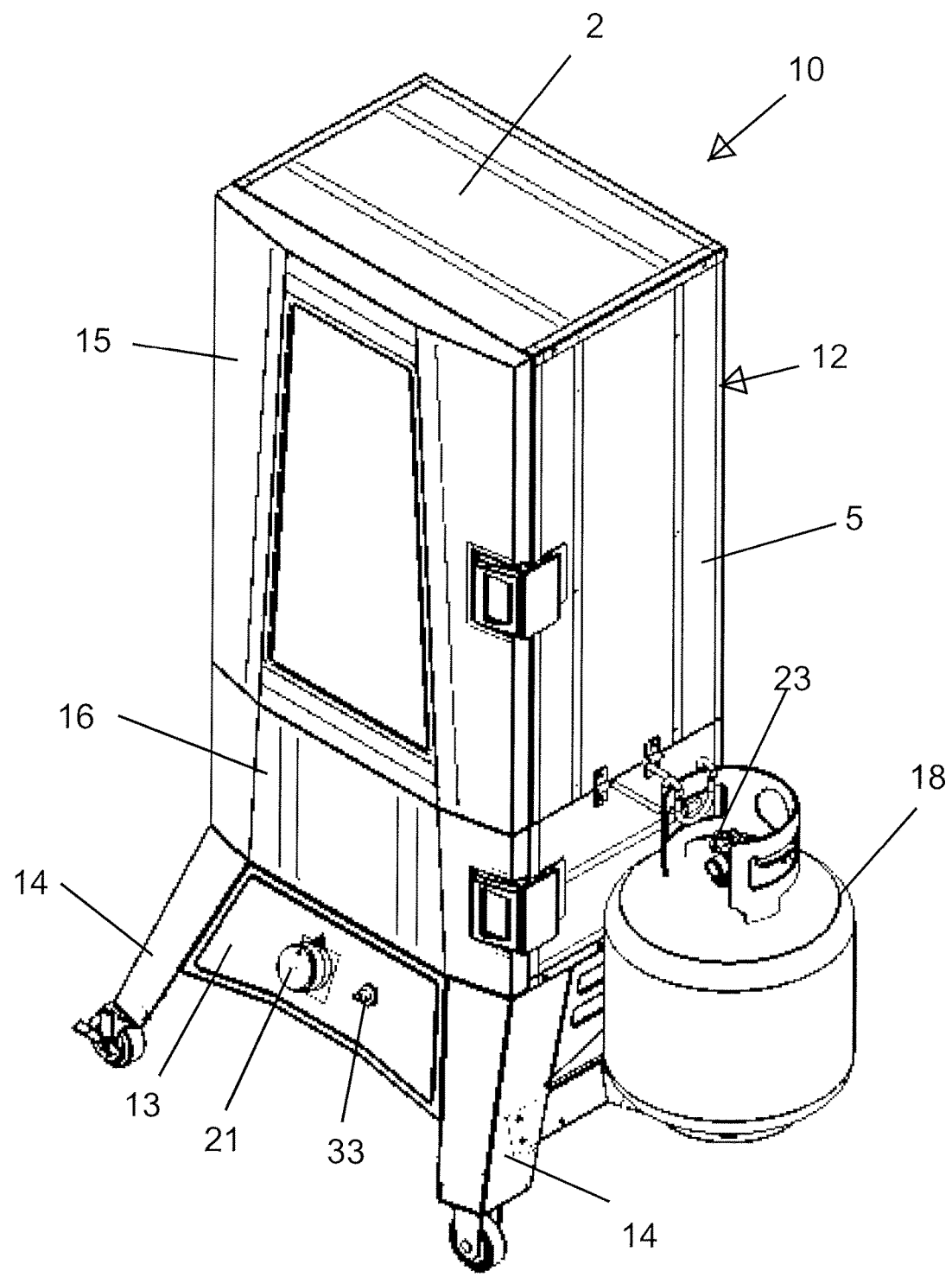
FIG. 1 is a front perspective view of a stand-alone gas-fired smoker in accordance with the present invention.

FIGS. 1-8C illustrate a stand-alone gas-fired smoker 10 having control features in accordance with the present invention. The stand-alone gas smoker 10 includes a cabinet 12 mounted on four legs 14. The cabinet 12 has a top 2, a bottom 3, a back 4, and sides 5. An upper front door 15 provides access to the interior of the cabinet 12 where food to be cooked is supported on vertically spaced grill racks 17. The food in the smoker 10 is heated and slowly cooked by heat from a gas burner 20 located near the bottom 3 of the smoker 10. The gas burner 20 is connected to a source (tank) 18 of flammable gas through a burner control mechanism 100 including a variable gas valve 22 that modulates the flow of gas to the gas burner 20.

The stand-alone gas-fired smoker 10 has a wood tray 24 that holds woodchips or other smoke generating material. The gas burner 20 heats the woodchips or other smoke generating material and thereby produces smoke to impart a smoked flavor to the food within the cabinet 12 as the food slowly cooks. A liquid pan 26 adjacent the gas burner 20 is filled with liquid that may include water or other flavor imparting liquids. As the liquid in the liquid pan 26 is heated, the resulting liquid vapor serves to impart additional flavoring to the food and to maintain a moist atmosphere inside the cabinet 12 and thus keeps the food from drying out during the slow cooking process. Drippings from the food fall either into the liquid pan 26 or onto the bottom 3 of the cabinet 12. The drippings landing on the bottom 3 are diverted into a removable grease cup 28 mounted below the bottom of the cabinet 12.

A lower front door 16 provides access to the wood tray 24, the liquid pan 26, the bottom 3 of the cabinet 12, and the gas burner 20. The wood tray 24 is attached to the inside of the lower front door 16 and swings with the lower front door 16 outwardly for easy access. The gas-fired smoker 10 has a front panel 13 for mounting a control knob 21 and an ignition switch 33. A heat shield 19 is mounted below the gas burner 20 to protect surfaces below the gas-fired smoker 10.

Figure 8A:
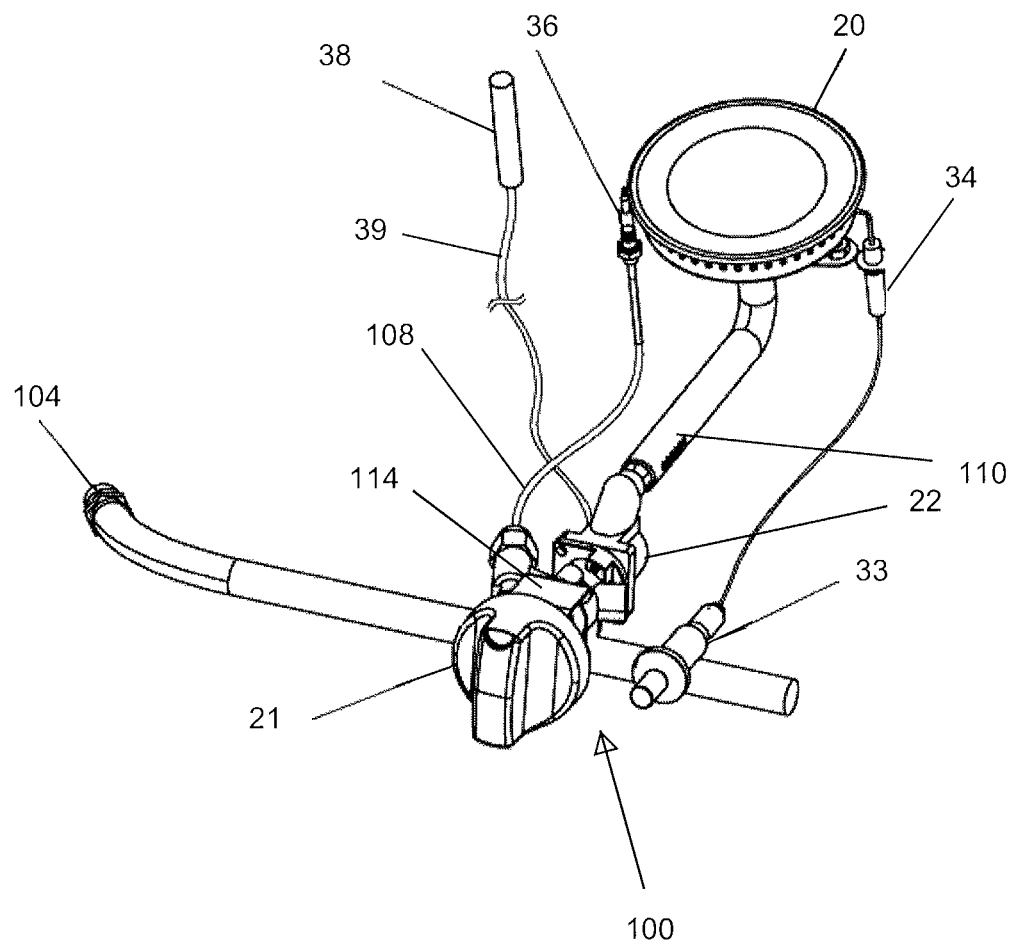
FIG. 8A is an enlarged view of the gas burner and the burner control mechanism of the gas-fired smoker in accordance with the present invention.
Figure 8B:
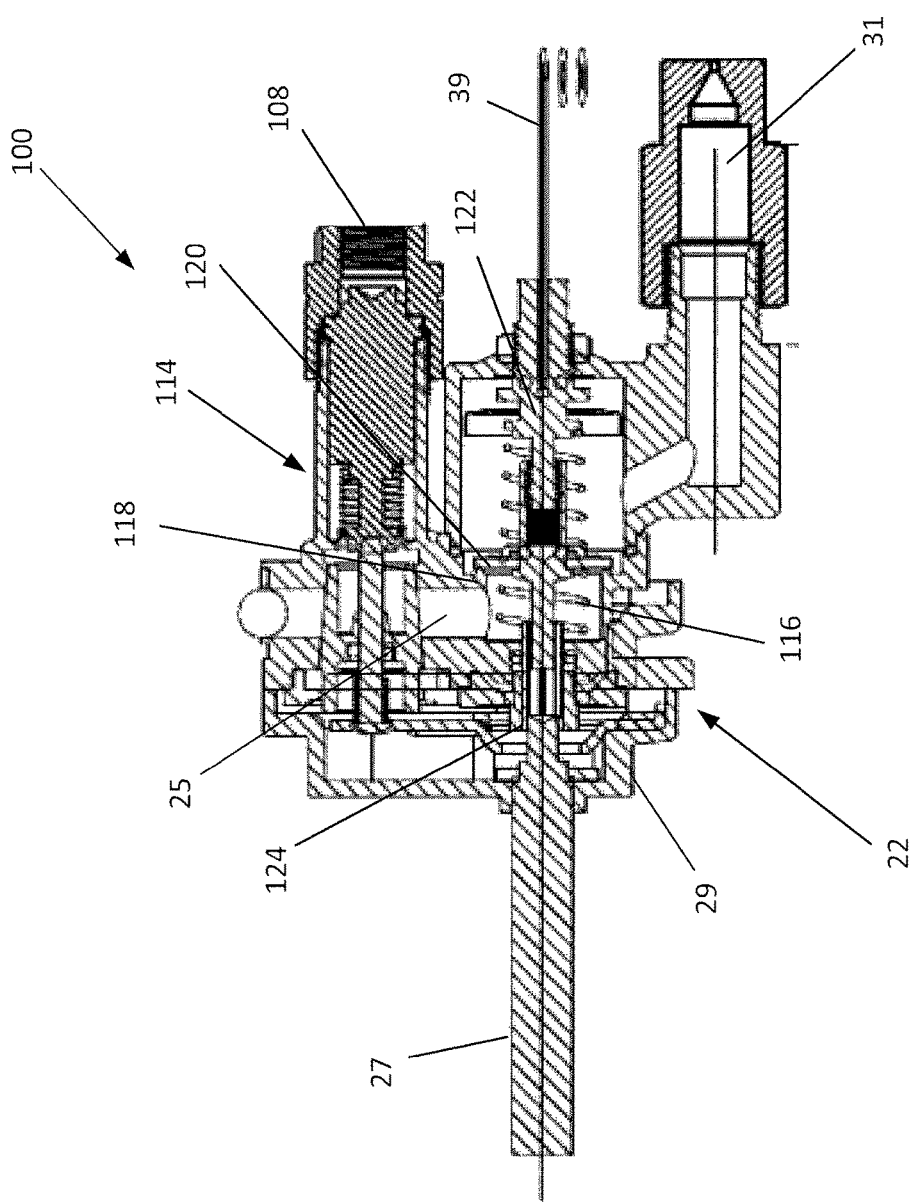
FIG. 8B is a side section view of the burner control mechanism including a variable gas valve and a safety/ignition valve for the gas-fired smoker in accordance with the present invention.
Figure 8C:
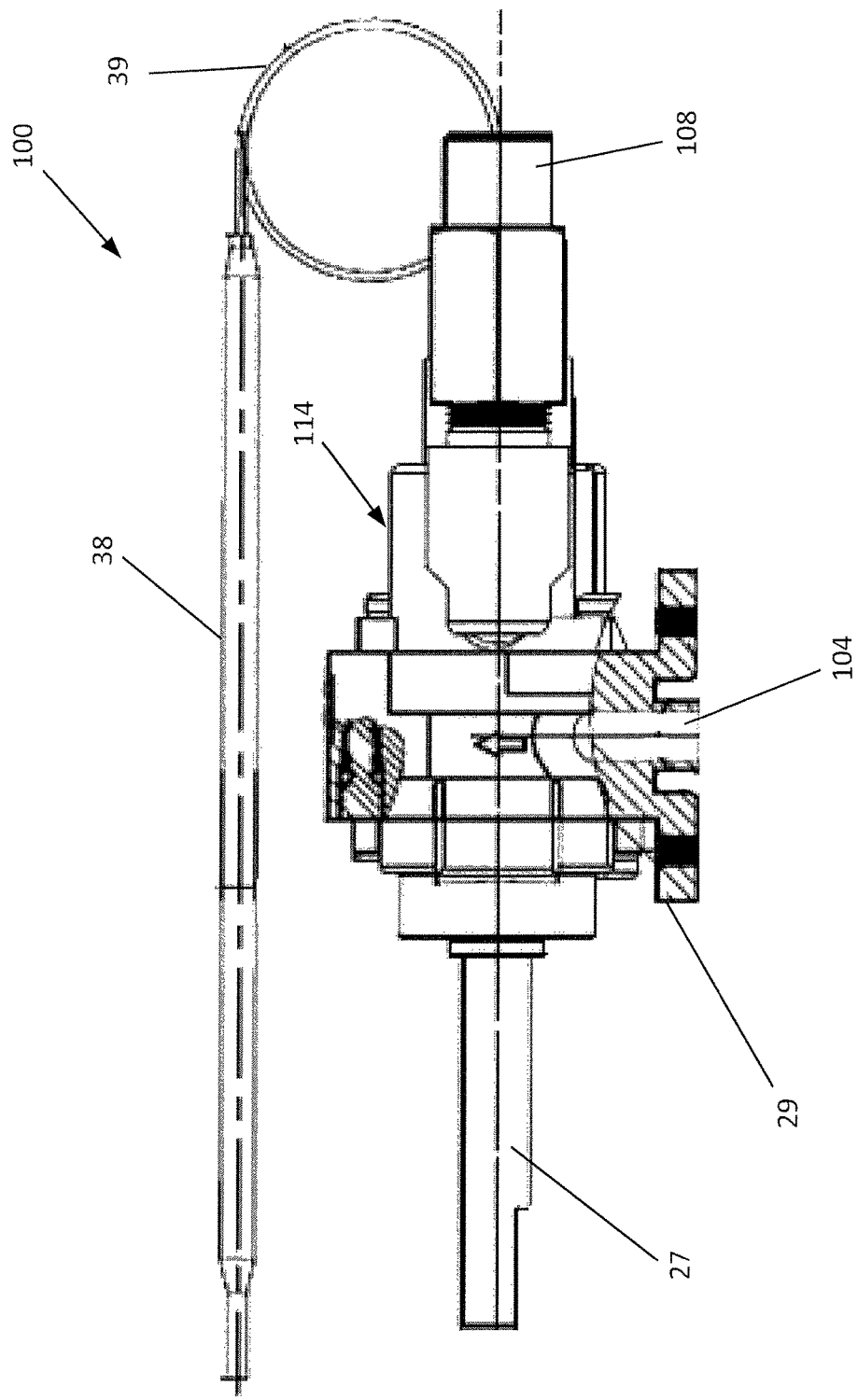
FIG. 8C is a top plan view of the burner control mechanism including the variable gas valve and the safety/ignition valve for the gas-fired smoker in accordance with the present invention.

FIGS. 8A, 8B, and 8C illustrate the burner control mechanism 100 for controlling the gas burner 20. The burner control mechanism 100 includes a gas inlet connection 104 (FIGS. 8A and 8C) for connecting the burner control mechanism 100 to the source of flammable gas in the tank 18, a safety/ignition valve 114, a flame sensor 36 connected to the safety/ignition valve 114 by flame sensor connection 108, an oil filled cabinet temperature sensor bulb 38 connected to the variable gas valve 22 by a capillary tube 39, a burner tube 110 connecting the variable gas valve 22 to the burner 20, a piezo igniter 34, and the igniter switch 33. The control knob 21 attached to control knob stem 27 controls the flow of gas from the gas inlet connection 104 to the safety/ignition valve 114 and sets the temperature by means of variable control valve 22 as will be described in greater detail below.

The safety/ignition valve 114 has two states selected by the control knob 21, an ignition state and a temperature control state. When in the ignition state, gas flows directly from the gas inlet connection 104 through the safety/ignition valve 114, through the wide open variable control valve 22, through the burner tube 110 and to the burner 20. The user by means of the piezo igniter switch 33 activates the piezo igniter 34 to create a spark and thereby ignite the gas at the burner 20. The user holds the knob 21 in the ignition state until flame sensor (thermocouple) 36 detects the presence of a flame at the burner 20 at which point the safety/ignition valve 114 is held open by a signal from the flame sensor 36 on the flame sensor connection 108. If the flame at the burner 20 is subsequently extinguished, such as being blown out by the wind, the signal on flame sensor connection 108 from the flame sensor 36 terminates, and the safety/ignition valve 114 closes thereby assuring that gas does not build up in the cabinet 12 thereby creating a fire or explosion hazard. Once the gas burner 20 has been ignited, the user turns the control knob from the ignition state to the temperature control state, thereby setting the desired temperature for the inside of the cabinet 12.

FIG. 8B shows a sectional view representation of the burner control mechanism 100 including the variable control valve 22 and the safety/ignition valve 114. The variable control valve 22 has a valve body 29 that includes gas inlet 25 from the safety/ignition valve 114, a valve seat 118, and a valve outlet 31 connected to the burner tube 110. The internal structure of the valve body 29 includes a flexible bellows 122, a valve plunger 120, a compression spring 116, and a threaded collar 124. The control knob stem 27 operated by control knob 21 has threads that engage the threaded collar 124 so that turning the control knob stem 27 causes the stem to advance into the valve body 29 and retract from the valve body 29. The internal end of the control knob stem 27 engages one end of the compression spring 116. The other end of the compression spring 116 engages one side of the valve plunger 120. The flexible bellows 122 engages the other side of the valve plunger 120. The expandable bellows is connected to the capillary tube 39 which is in turn attached to the cabin temperature sensor bulb 38.

Figure 10:
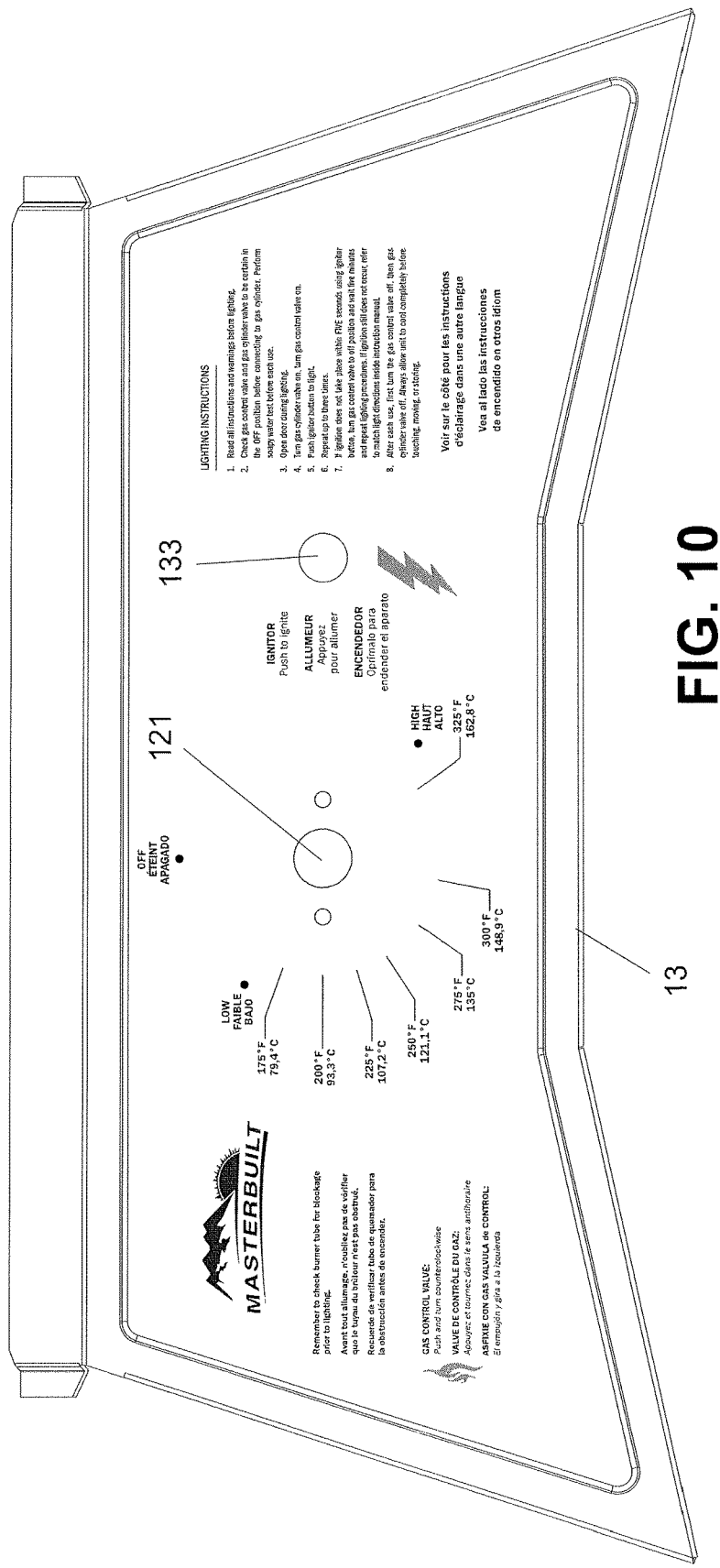
FIG. 10 is a plan view of a front control panel of the gas-fired smoker in accordance with the present invention.

As the control knob stem 27 is turned counterclockwise, as shown in in FIG. 8A, the control knob stem 27 advances into the valve body 29 and compresses the compression spring 116 thereby forcing the plunger 120 toward the right as shown in FIG. 8B. The rightward force on the plunger 120 displaces the plunger 120 to the right and away from the valve seat 118 thereby opening the valve and allowing gas to flow from the inlet 25 to the outlet 31 and subsequently to the gas burner 20 through the burner tube 110. Initially, the rightward force on the plunger 120 against the flexible bellows 122 causes the bellows 122 to compress thereby fully opening the variable gas valve 22. As the gas burner 20 heats the cabinet 12, the oil in the temperature sensor bulb 38 expands through capillary tube 39 and exerts a leftward force on the flexible bellows 122 is shown in FIG. 8B. The leftward force in the flexible bellows 122 created by the oil expanding into the flexible bellows 122 acts against the compression spring 116 and forces the plunger 120 into proximity to the seat 118 thereby tending to close the variable control valve 22. As the temperature in the cabinet 12 rises and falls, the plunger 120 moves left and right accordingly to restrict and expand the flow of gas through the variable control valve 22. In that manner, the variable control valve 22 controls the internal temperature of the cabinet 12 within a range centered on the temperature selected by the user using the control knob 21 attached to the control knob stem 27. FIG. 10 shows the control panel 13 with a control knob access hole 121 and an igniter switch mounting hole 133. As the burner control knob 27 is turned, the user selects temperatures from "Low" to "High" with "High" being in the ignition setting of the burner control knob 21.

Figure 2:
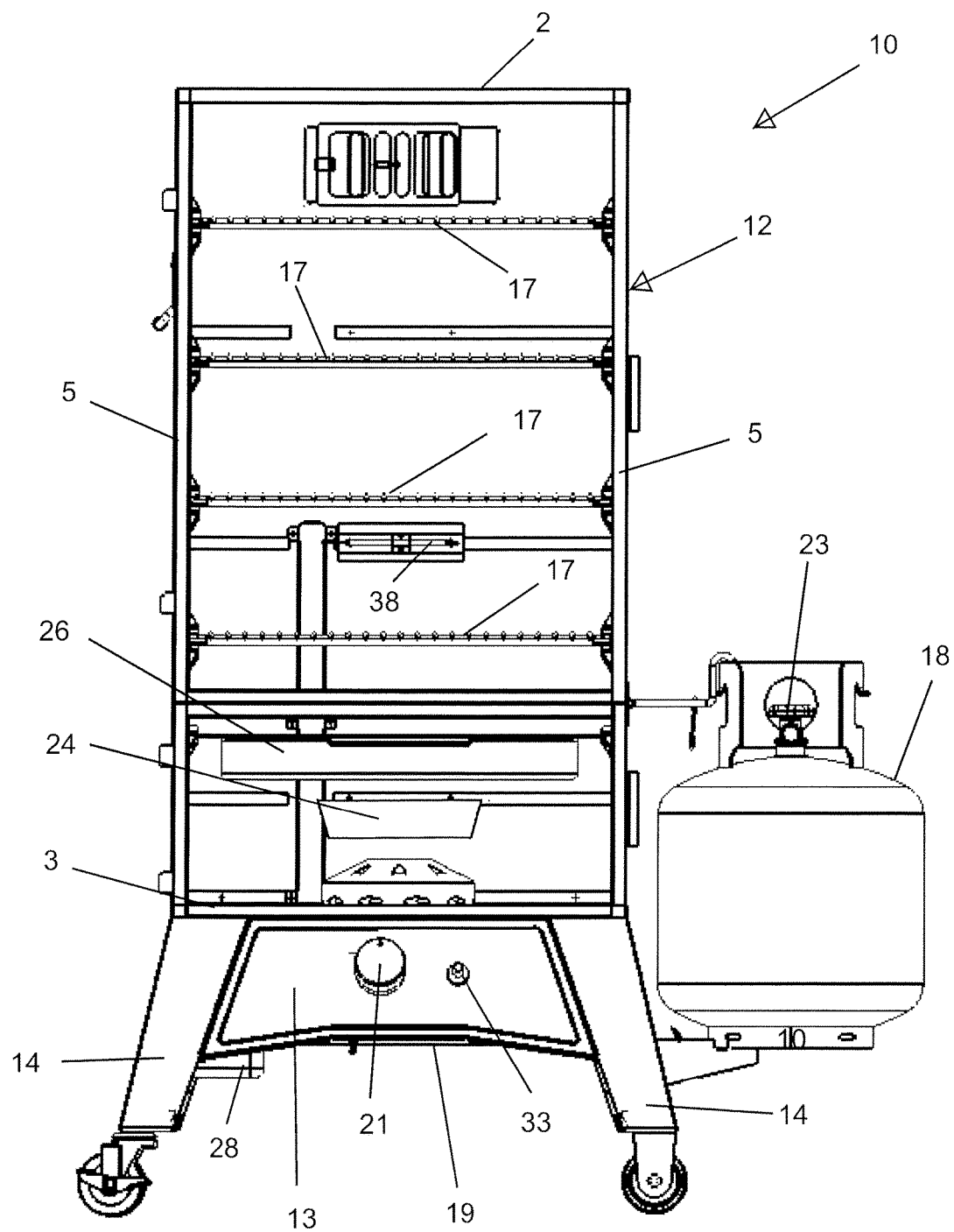
FIG. 2 is a front elevation view of the gas-fired smoker in accordance with the present invention with the doors removed to reveal internal detail of the gas-fired smoker.
Figure 3:
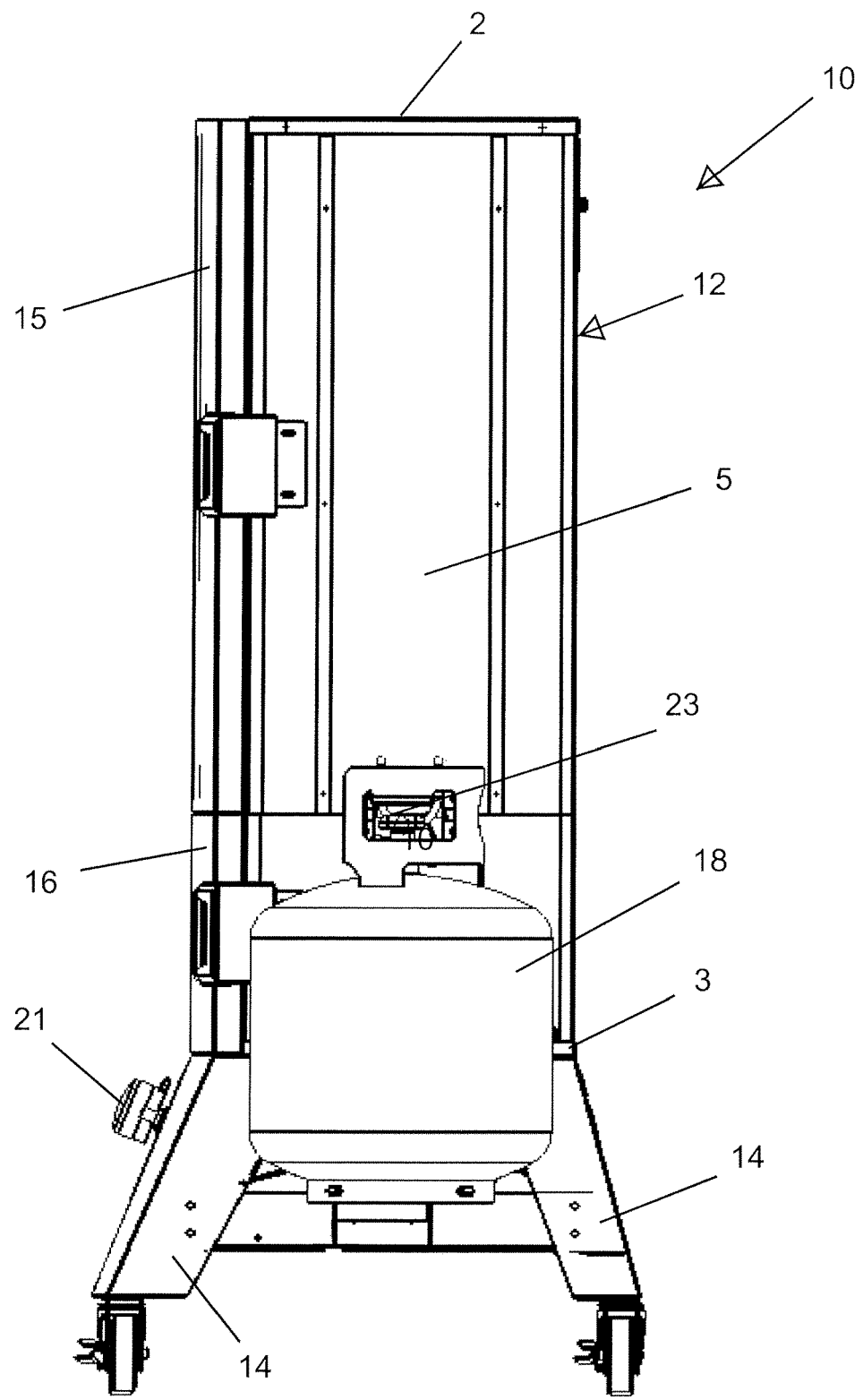
FIG. 3 is a right side elevation view of the gas-fired smoker in accordance with the present invention.
Figure 4:
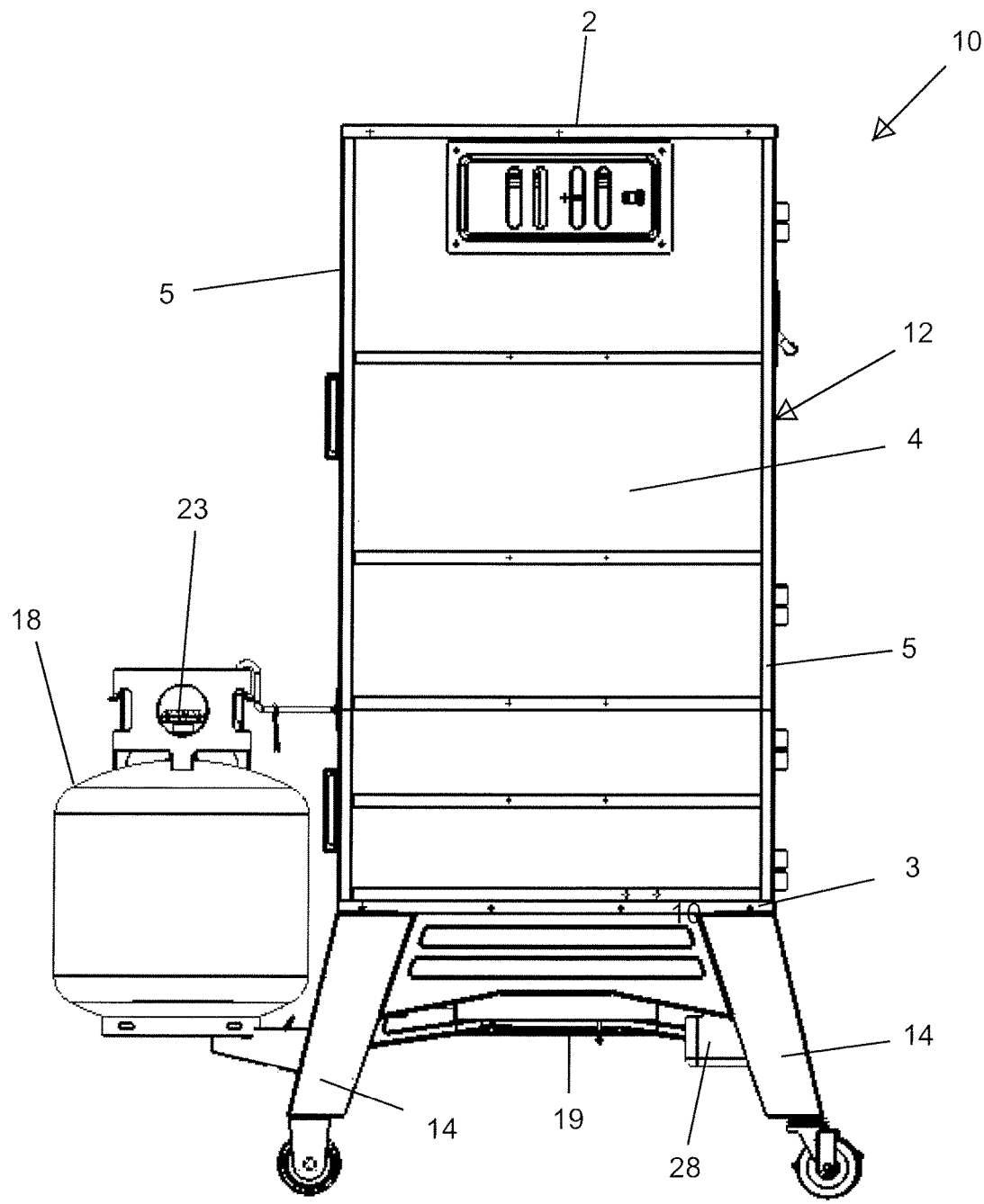
FIG. 4 is a back elevation view of the gas-fired smoker in accordance with the present invention.
Figure 5:
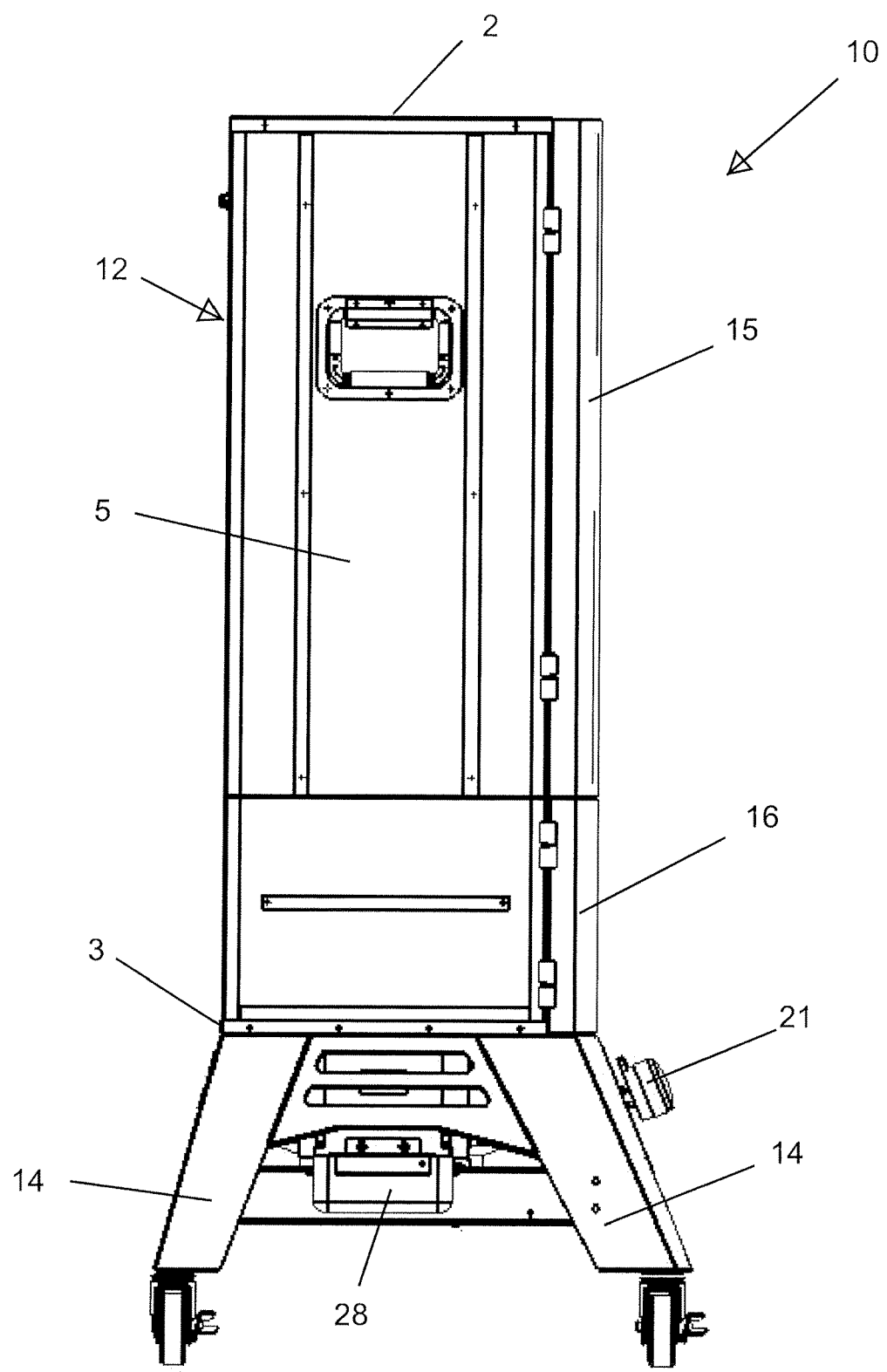
FIG. 5 is a left side elevation view of the gas-fired smoker in accordance with the present invention.
Figure 6:
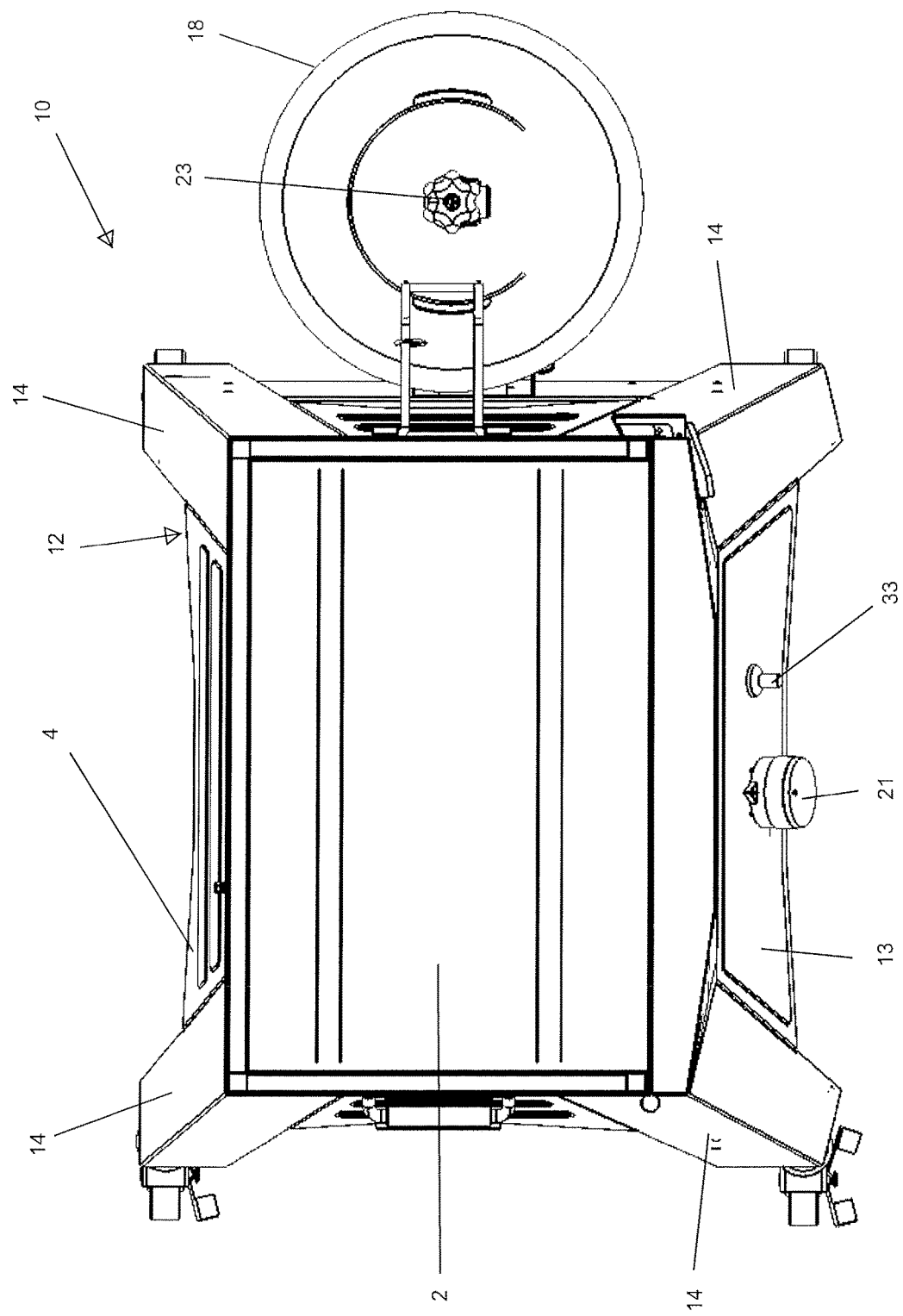
FIG. 6 is a top plan view of the gas-fired smoker in accordance with the present invention.
Figure 7:
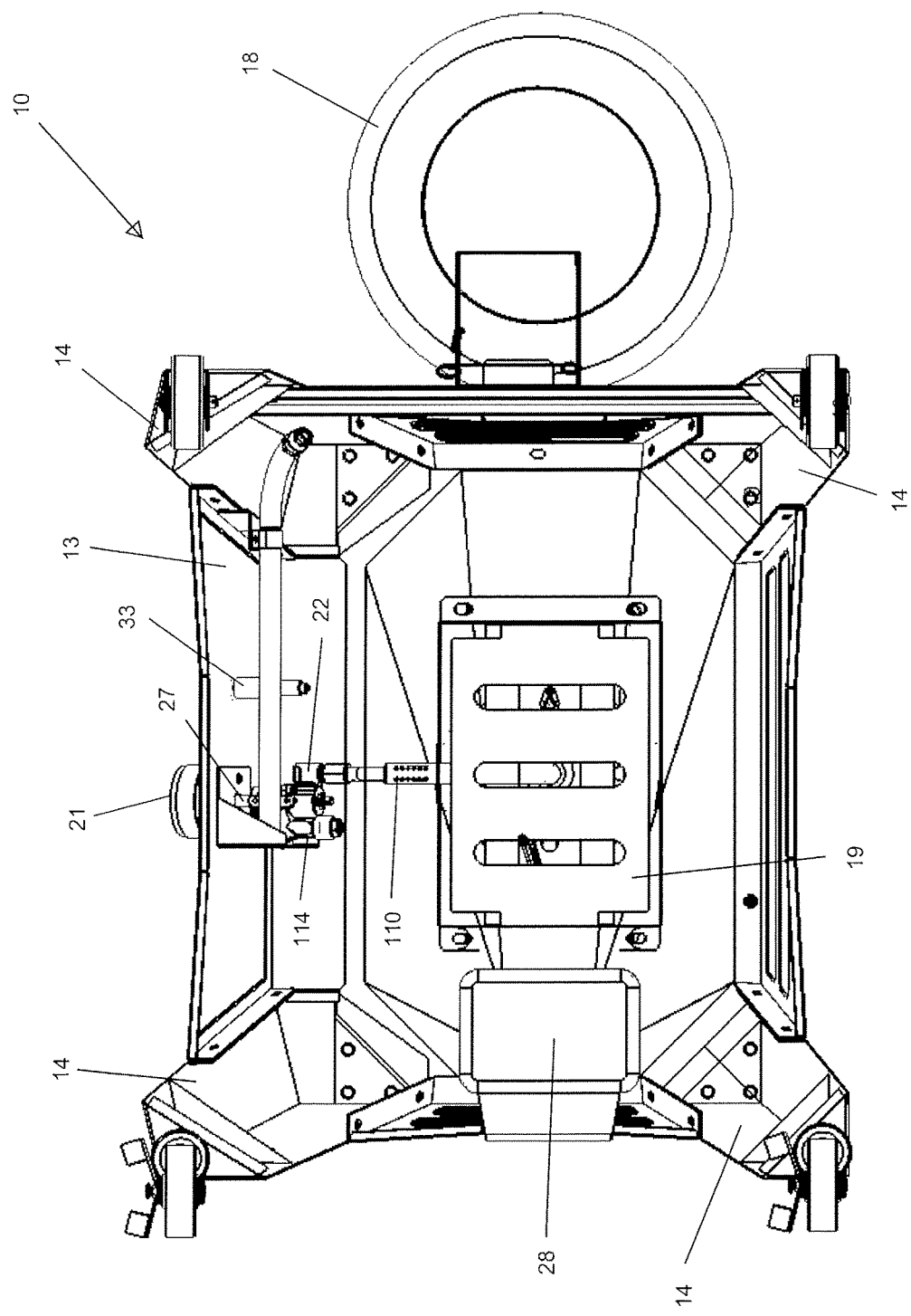
FIG. 7 is a bottom plan view of the gas-fired smoker in accordance with the present invention.

In order to maintain the set temperature in the cabinet 12 within an acceptable range of temperature, the oil filled cabinet temperature sensor bulb 38 is located in the cabinet at a position where the sensed temperature best reflects the average temperature within the cabinet 12. FIG. 2 shows the location of the cabinet temperature sensor bulb 38. The cabinet 12 has a range of internal temperatures within the volume defined by the cabinet 12. In order to ensure consistent temperature sensing by the cabinet temperature sensor bulb 38, the position of the average cabinet temperature is determined empirically for the cabinet 12 by positioning temperature sensors throughout the cabinet 12 and finding the location that accurately reflects the average of all of the measured temperatures found in the cabinet 12. Once the average temperature position has been determined, the temperature sensor bulb 38 is placed at that location inside the cabinet 12 as shown for example in FIG. 2.

Figure 9:
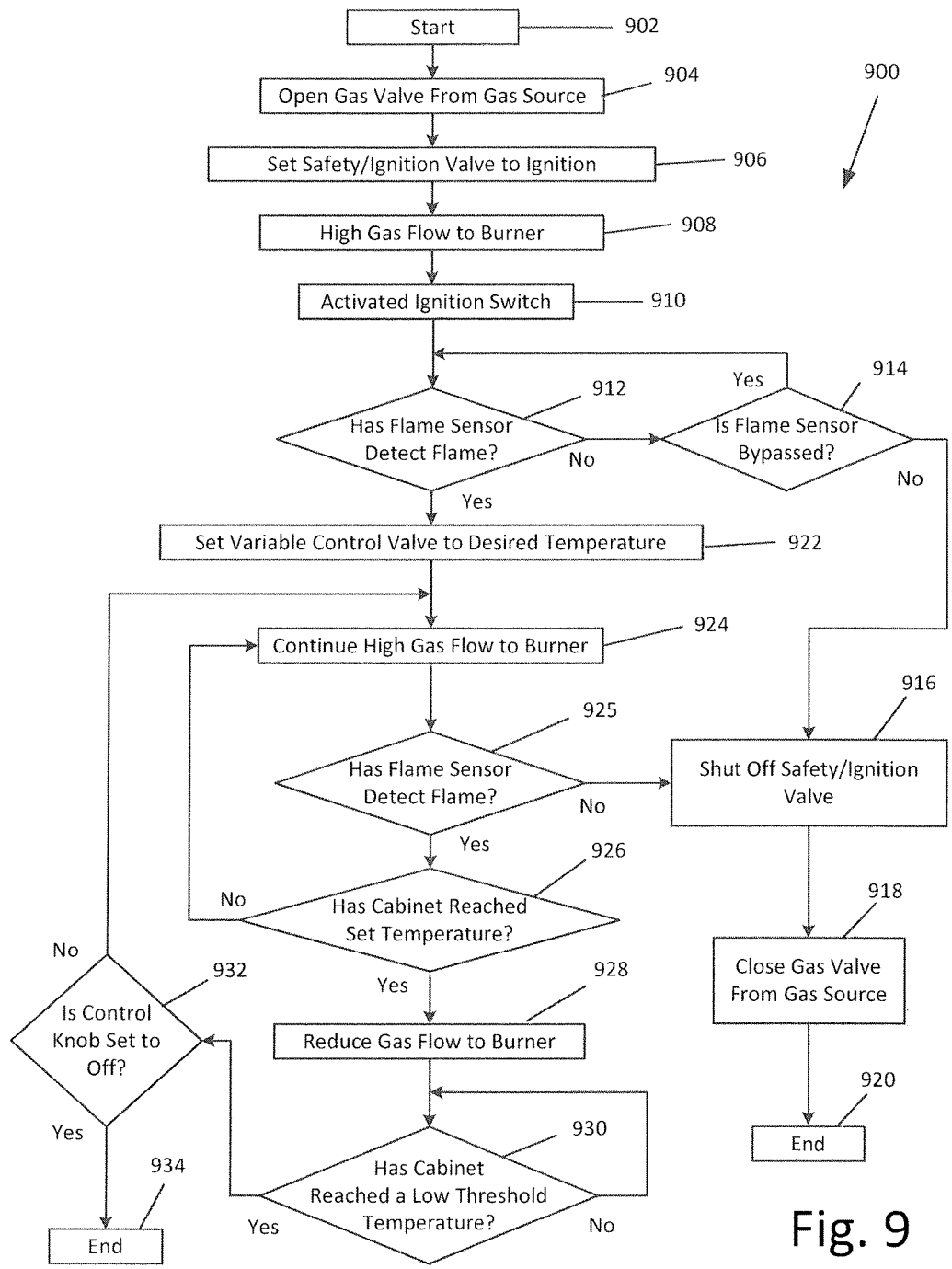
FIG. 9 is a flowchart showing the operation of the gas-fired smoker in accordance with the present invention.

FIG. 9 illustrates the operating method 900 for the burner control mechanism 100. The operating method 900 begins at step 902 and proceeds to step 904 where the user opens the manual gas valve 23 (FIGS. 1, 2, 3, 4, and 6) on the gas source 18. At step 906, the user turns the control knob 21 fully counterclockwise to set the safety/ignition valve 114 to the ignition state. At step 908, the ignition state produces high gas flow through the safety/ignition valve 114 and the variable control valve 22 to the gas burner 20. Once the gas begins flowing to the gas burner 20 at step 908, the method proceeds to step 910 where the user activates the piezo igniter 34 by means of the piezo igniter switch 33. From step 910, the method proceeds to decision step 912.

At decision step 912, the method determines whether the flame sensor (thermocouple) 36 has detected the presence of a flame at the gas burner 20. If the flame sensor 36 has not detect the presence of a flame at the gas burner 20, the method follows the "no" branch to decision step 914. At decision step 914, the method determines if the user is still holding the control knob 21 in the ignition position. If the control knob is in the ignition state, the method follows the yes branch and continues to monitor the condition of the flame sensor at step 912. If on the other hand, control knob is no longer in the ignition state, the method follows the "no" branch to step 916 where the safety/ignition valve 114 is closed. From step 916, the method proceeds to step 918, where the user closes the manual gas valve 23 on the tank 18, and the method ends at step 920.

If at step 912 a flame is detected by the flame sensor 36 at the gas burner 20, the method follows the "yes" branch to step 922 where the user sets the desired temperature for the cabinet 12. From step 922, the method proceeds to step 924 where the safety/ignition valve 114 and that the variable gas valve 22 remain fully open and the high gas flow to the lighted gas burner 20 continues.

From step 924, the method proceeds to decision step 925 where, for safety, the method determines if the gas burner 20 is still lit. If the gas burner 20 has gone out, the method follows the "no" branch to step 916 where the safety/ignition valve 114 is closed in order to avoid build-up of gas in the cabinet 12. From step 916, the method proceeds through step 918 to end 920 as previously described.

If, on the other hand at step 925, the gas burner 20 is still lit, the method follows the "yes" branch to decision step 926 where the method determines whether the cabinet temperature has reached the temperature set by the user by means of control knob 21 and variable gas valve 22. If the cabinet has not reached the set temperature, the method follows the "no" branch and recirculates back to step 924, step 925, and step 926. On the other hand, if at step 926 the cabinet has reached the set temperature, the method follows the "yes" branch to step 928 where the variable gas valve 22 reduces the gas flow to the gas burner 20 as previously described in connection with FIGS. 8A, 8A, and 8C.

With the gas flow reduced to the gas burner 20 at step 928, the method proceeds to decision step 930. At decision step 930, the method determines if the temperature in the cabinet has reached a predetermined low threshold temperature. If the cabinet has not reached the low threshold temperature, the method follows the "no" branch and circulates back to step 930. If on the other hand, the cabinet has reached the low threshold temperature, the method follows the "yes" branch to step 932. At step 932, the method determines whether the user has set the control knob to off. If the control knob has not been set to off, the method follows the "no" branch back to step 924 and the cooking process continues. If, on the other hand, the user has set the control knob to off at step 932, the method follows the "yes" branch to step 918. At step 918, the user closes the manual gas valve 23 on the tank 18, and the method ends at step 920.

While this invention has been described with reference to preferred embodiments thereof, it is to be understood that variations and modifications can be affected within the spirit and scope of the invention as described herein and as described in the appended claims.

We claim:

1. A stand-alone gas-fired smoker for cooking a food product comprising:
   a. a cabinet with a top, a bottom, sides, a back, an access door, and at least one rack vertically located within the cabinet for holding the food product to be cooked;
   b. a gas burner located adjacent the bottom of the cabinet and connected to a source of flammable gas by means of a variable gas valve, the variable gas valve comprising:
     i. a valve body having
       (a) an inlet port;
       (b) an outlet port; and
       (c) a valve seat
     ii. a valve plunger for engaging the valve seat;
     iii. a control knob stem for advancing into and retracting from the valve body;
     iv. a spring positioned between the control knob stem and the valve plunger, the spring engaging one side of the valve plunger;
     v. a flexible bellows positioned between the valve body and an opposite side of the valve plunger;
     vi. an oil filled temperature sensor bulb connected to the bellows of the variable gas valve by a capillary tube for exerting pressure inside the bellows and thereby modulating the amount of gas passing through the variable gas valve to the gas burner;

c. a safety/igniter valve connected between the source of flammable gas and the variable gas valve; and d. a flame sensor connected to the safety/igniter valve for sensing the existence of a flame at the gas burner and closing the safety/igniter valve when the gas burner is extinguished.

2. The stand-alone smoker of claim 1, further comprising piezo igniter for igniting the gas burner.

3. The stand-alone smoker of claim 1, wherein the oil filled temperature sensing bulb is positioned in the cabinet to sense average temperature within the cabinet.

\* \* \* \* \*